United States Patent
Ghosh et al.

(10) Patent No.: US 10,870,751 B2
(45) Date of Patent: Dec. 22, 2020

(54) SURFACTANT STABILIZED VAM-VEOVA10 TERPOLYMER BASED EMULSION WITH GOOD FREEZE THAW STABILITY AND A PROCESS THEREOF

(71) Applicant: ASIAN PAINTS LTD., Mumbai (IN)

(72) Inventors: Swapan Kumar Ghosh, Navi Mumbai (IN); S Patnaik, Navi Mumbai (IN); E Saravanakumar, Navi Mumbai (IN); Vishal Muralidharan, Navi Mumbai (IN); B. P. Mallik, Navi Mumbai (IN)

(73) Assignee: ASIAN PAINTS LTD., Mumbai (IN)

( * ) Notice: Subject to any disclaimer, the term of this patent is extended or adjusted under 35 U.S.C. 154(b) by 179 days.

(21) Appl. No.: 15/531,024

(22) PCT Filed: Mar. 30, 2015

(86) PCT No.: PCT/IN2015/000152
§ 371 (c)(1),
(2) Date: May 26, 2017

(87) PCT Pub. No.: WO2016/088131
PCT Pub. Date: Jun. 9, 2016

(65) Prior Publication Data
US 2017/0327679 A1    Nov. 16, 2017

(30) Foreign Application Priority Data

Dec. 1, 2014  (IN) .......................... 3832/MUM/2014

(51) Int. Cl.
*C08L 31/04*  (2006.01)
*C08F 2/24*  (2006.01)
*C08F 8/00*  (2006.01)
*C08F 218/08*  (2006.01)
*C08F 216/14*  (2006.01)
*C09D 133/08*  (2006.01)

(52) U.S. Cl.
CPC ................ *C08L 31/04* (2013.01); *C08F 2/24* (2013.01); *C08F 216/1466* (2013.01); *C08F 218/08* (2013.01); *C09D 133/08* (2013.01); *C08L 2201/52* (2013.01)

(58) Field of Classification Search
CPC ............... C08L 31/04; C08F 2/24; C08F 8/00
USPC ........................................................ 524/814
See application file for complete search history.

(56) References Cited

U.S. PATENT DOCUMENTS

2013/0220376 A1 *  8/2013  Gallucci .................. C11D 1/24
                                                                    134/19

FOREIGN PATENT DOCUMENTS

| EP | 2770034 A1 * | 8/2014 | ............... C09K 3/22 |
| EP | 2770034 A1 | 8/2014 | |
| WO | WO-2014097309 A1 * | 6/2014 | .......... C09D 133/06 |
| WO | WO2014097309 A1 | 6/2014 | |

* cited by examiner

*Primary Examiner* — Kelechi C Egwim
(74) *Attorney, Agent, or Firm* — Neifeld IP Law, PLLC

(57) ABSTRACT

A surfactant stabilized vinyl acetate ter-polymer based emulsion is provided comprising surfactant combination based freeze thaw stabilized vinyl acetate ter-polymer emulsion wherein said surfactant combination comprises non-ionic surfactant in combination with at least two polymerizable anionic reactive surfactants. A process of manufacturing the said emulsion is also provided, which process in comprising of selective sequence based steps and upon employing selective amounts of ingredients provides for said freeze thaw stable emulsion that is freeze thaw stable upto at least 5 cycles of freezing and thawing and yet maintains a particle size of 130-150 nm.

3 Claims, No Drawings

SURFACTANT STABILIZED VAM-VEOVA10 TERPOLYMER BASED EMULSION WITH GOOD FREEZE THAW STABILITY AND A PROCESS THEREOF

FIELD OF THE INVENTION

The present invention particularly relates to a surfactant stabilized vinyl acetate ter-polymer based emulsion with a particle size of 130-150 nm comprising surfactant combination based freeze thaw stabilized vinyl acetate ter-polymer emulsion wherein said surfactant combination comprises non-ionic surfactant in combination with at least two polymerizable anionic reactive surfactants. More particularly, a process for manufacture of said emulsion is provided free of any freeze thaw stabilizers (additives), which process in comprising of selective sequence based steps and upon employing selective amounts of ingredients provides for said freeze thaw stable emulsion that is freeze thaw stable up to at least 5 cycles of freezing and thawing and yet maintains a particle size of 130-150 nm.

BACKGROUND ART

Vinyl acetate polymers are used as binders in decorative paints. While use of colloid stabilised ter-polymers of Vinyl acetate with VeoVa10 and Butyl acrylate are quite common, to enhance the stability of emulsion and paints, surfactant stabilised Vinyl acetate ter-polymer with VeoVa10 and Butyl acrylate is not commonly known to give good freeze-thaw stability, from literatures and Patents. Freeze thaw stability is a property if emulsion is frozen at −5° C. for 16 hours and thoroughly thawed after 8 hours at 30° C., with this being 1 cycle, the emulsion polymer is supposed to pass 5 such cycles, to have it known for good freeze thaw stability.

Attempt has been made to develop surfactant stabilised Vinyl acetate-Vinyl ester of versatic acid derivatives, based terpolymer with butyl acrylate to match performance of styrene-acrylate copolymer using emulsion polymerisation technique via free radical mechanism using thermal initiator. While literature reports indicate that for improving stability of vinyl acetate based emulsions addition of colloids are inevitable, it is important for the state of the art to achieve this property through combination of surfactants due to the fact that surfactant does not adsorb strongly at the hydrophilic vinyl acetate latex particle surface and definitively less than on acrylic latex.

Specific examples of vinyl ester paint vehicle systems known in the state of the art are discussed hereunder:

WO/2013/085760 (dated: 13 Jun. 2013) discloses aqueous dispersion of vinyl acetate ethylene or vinyl acetate polymer, stabilized by polyvinyl alcohol and optionally also by a surfactant, wherein the polymer does not include units of any N-methylol-containing monomer. 2-acrylamido Propane sulphonic acid salts are employed as auxiliary monomers, to attain low formaldehyde and high wet strength polymer binder whereby this prior art does not target any freeze thaw stable emulsion attained through emulsion polymerisation.

In WO/2013/059765 (dated: 25 Apr. 2013) teaches aqueous dispersion of vinyl acetate based polymers stabilized by sole reactive surfactant with two aromatic structure for giving freeze thaw stable emulsions. This prior art patent while is directed to attain freeze thaw stable emulsion attains the same with surfactants involving aromatic groups.

WO/2013/174934 (dated 28 Nov. 2013) discloses method for preparing aqueous dispersion of Vinyl acetate-ethylene based polymers stabilised by neutralised phosphate surfactant and non-ionic surfactants, with auxiliary monomers viz; VTMO, glycidyl acrylate, to improve the scrub resistance of paints.

EP1541648 (dated 15 Jun. 2005) teaches a method for preparing an aqueous dispersion of copolymer emulsions viz; vinyl acetate with polymerizable surfactant, which reduces the quantity of solvents required to get freeze thaw stability of paints having low volatile organic compounds.

EP2676976 (dated 25 Dec. 2013) discloses a method for preparing an aqueous dispersion of copolymer with vinyl acetate with hydrolysable alkoxysilanes to improve wet scrub resistance in paints and does not indicate any freeze-thaw stable emulsion.

U.S. Pat. No. 4,219,454 (dated 30 Aug. 1983) teaches a method of preparing colloid-stabilised vinyl acetate-acrylate polymer emulsions having ureido functionality to improve the wet adhesion properties of paint and does indicate any freeze-thaw stable emulsion based on the combination of surfactants.

While addition of colloid increases the particle size of vinyl acetate based emulsions to 500-600 nm which has detrimental effect on binding power of emulsion when used, it is therefore a strong need in the art to provide for an emulsion of ter-polymer of vinyl acetate and a process thereof that would, successfully stabilise the ter-polymer of vinyl acetate in an emulsion involving a combination of surfactant and would yet maintain good freeze thaw stability and a particle size limited to upto 150 nm.

OBJECTS OF THE INVENTION

It is thus the primary object of the present invention to provide for a freeze thaw stable vinyl acetate ter-polymer based emulsion with superior binding power comprising surfactant combination and a process for preparing the same free of any freeze-thaw stable additive.

It is another object of the present invention to provide for said freeze thaw stable emulsion which while on one hand would be freeze thaw stable upto at least 5 cycles of freeze thaw stability and on the other would maintain a particle size of the emulsion to upto 150 nm.

It is yet another object of the present invention to provide for freeze thaw stable emulsions as compared to styrene-acrylate copolymer.

It is another object of the present invention to provide for said emulsions which would achieve freeze thaw stability free of colloids the attributes being based on a surfactant combination that would not adsorb strongly at the hydrophilic vinyl acetate latex particle surface and less on acrylic latex to be thus free from any tendency to increase the particle size eventually having a detrimental effect on the binding power of the emulsion.

It is yet another object of the present invention to provide for an emulsion involving environmentally friendly ingredients that are non-carcinogenic and would also not involve any additives like freeze thaw stabilizers, glycols or any other chemicals.

SUMMARY OF THE INVENTION

According to the basic aspect of the present invention there is provided surfactant stabilized vinyl acetate ter-polymer based emulsion comprising surfactant combination based freeze thaw stabilized vinyl acetate ter-polymer emulsion wherein said surfactant combination comprises non-ionic surfactant in combination with at least two polymerizable anionic reactive surfactants, said emulsion, being freeze thaw stable and also having a particle size of 130-150 nm.

Advantageously, said emulsion is freeze thaw stable upto at least 5 cycles of freezing and thawing.

It is thus surprisingly found by way of the present invention that a freeze thaw stable surfactant stabilized vinyl acetate ter-polymer based emulsion could be attained free of any influence of colloids, additives (freeze thaw stabilizers), such as polyvinyl alcohol and/or hydroxy ethyl cellulose based on a selective surfactant combination comprising non-ionic surfactant in combination with at least two polymerizable anionic reactive surfactants, said emulsion being freeze thaw stable and having a particle size of 130-150 nm.

Significantly the surfactant combination comprising a non-ionic surfactant in combination with said at least two polymerizable anionic reactive surfactants derivative selected from 2-acrylamido 2-methyl-propan sulphonic acid-sodium salt (AMPSS) and surfactant of Formula (I) hereunder

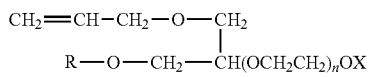

Where R is alkyl group, X is $SO_3NH_4$, $SO_3Na$, n=10; are selected to be polymerizable anionic reactive surfactants and react with monomers to be covalently bonded with the monomers and are free of aromatic groups that enables attainment of freeze thaw and particle size stabilized emulsion with superior binding power, which is significant as steric hindrance as an advantageous factor for particle stabilization is completely absent in the presence of aliphatic branched structure with long alkyl/ether group based surfactants of the present invention. Further advantageous attributes of the emulsion are endowed by the non-ionic surfactant being non-ionic fatty alcohol having ethylene oxide content of 19-20 present in the emulsion in 0.2 wt % such that it offers freeze thaw stability in combination with other surfactants without affecting the reaction rate of the monomers.

Most significantly it was found that said emulsion could only be achieved by selective sequence of addition of ingredients in selective amounts whereby addition of 2-acrylamido 2-methylpropan sulphonic acid-sodium salt (AMPSS), one of the two reactive surfactants is added into pre-emulsion only after providing the seed of 5% pre-emulsion without AMPSS to ensure that AMPSS does not homo-polymerize in water and to react with the other ingredients such as monomers Vinyl acetate, VeoVa10, Butyl acrylate and other polymerizable anionic reactive surfactant. Advantageously, as the acrylamides are carcinogenic, an environmentally friendly non-carcinogenic 2-acrylamido propane sulphonic acid salt when employed is found to give the desired emulsion attributes.

According to another preferred aspect of the present invention in said emulsion said polymerizable anionic reactive surfactants are selected to be polymerizable and react with monomers to be covalently bonded with the monomers and are preferably selected from acrylamide derivative of 2-acrylamido 2-methyl-propan sulphonic acid-sodium salt (AMPSS) and surfactant of Formula (I) below

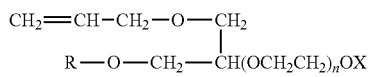

Where R is alkyl group, X is $SO_3NH_4$, $SO_3Na$, n=10;

The amount of surfactant as in formula (I) is in the levels of 0.3 to 0.4 wt % and 2-acrylamido propane sulfonic acid sodium salt in the levels of 0.8 to 1.2 wt % in pre-emulsion.

Preferably said emulsion comprises non-ionic surfactant in the levels of 0.2 to 0.5 wt % which is non-ionic fatty alcohol having ethylene, oxide content of 19-20 moles.

More preferably said vinyl acetate based emulsions comprises Vinyl acetate-VeoVa10-Butyl acrylate ter-polymers, Vinyl acetate-Veova10 copolymers stabilized with two reactive surfactants combined with one non-ionic surfactant in pre-emulsion and said non-ionic surfactant alone in reactor stage, is employed to get a stable emulsion polymer.

According to yet another preferred aspect of the present invention said emulsion is obtained of reacting monomers of Vinyl acetate, VeoVa10, Butyl acrylate and at least two polymerizable anionic reactive surfactants including 2-acrylamido 2-methylpropan sulphonic acid-sodium salt (AMPSS) and a surfactant of formula (I) in a pre-emulsion medium comprising non-ionic surfactant whereby 2-acrylamido 2-methylpropane sulphonic acid-sodium salt (AMPSS) is added into AMPSS free pre-emulsion seed to favour AMPSS reaction with said monomers and avoiding homo polymerization.

According to another aspect of the present invention a process for the preparation of the surfactant stabilized vinyl acetate ter-polymer based emulsion is provided comprising a freeze thaw characteristic imparting surfactant combination of at least two reactive polymerizable anionic surfactants including surfactant of Formula (I) below

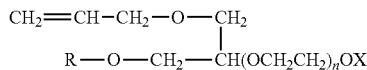

Where R is alkyl group, X is $SO_3NH_4$, $SO_3Na$, n=10; an acrylamide derivative of 2-acrylamido 2-methylpropan sulphonic acid-sodium salt (AMPSS) and a non-ionic surfactant and wherein said surfactants of said surfactant combination are reacted selectively in a 2-acrylamido 2-methylpropan sulphonic acid-sodium salt (AMPSS) free seed pre-emulsion of monomers comprising Vinyl acetate-VeoVa10-Butyl acrylate or Vinyl acetate-VeoVa10, along with Methacrylic acid, preferably about 5% by wt. of the pre-emulsion having the surfactant of Formula (I) along with said non-ionic surfactant followed by subsequent addition of said 2-acrylamido 2-methylpropan sulphonic acid-sodium salt (AMPSS) to favour freeze thaw stability of the emulsion without affecting the reaction rate of the monomers in said emulsion and facilitating reaction of AMPSS with monomers in said pre-emulsion by avoiding unwanted homo-polymerization reactions.

Preferably said process comprises the steps of (I) providing reactor charge of non-ionic surfactant together with potassium persulphate and water;

(II) providing said pre-emulsion comprising (a) polymerizable anionic reactive surfactants including surfactant of Formula (I) below

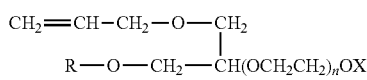

Where R is alkyl group, X is $SO_3NH_4$, $SO_3Na$, n=10;

(b) non-ionic surfactant in the levels of 1 to 1.2 wt % which is a non-ionic fatty alcohol having ethylene oxide content of 19-20 mole;

(c) monomers of Vinyl acetate, VeoVa10, Butyl Acrylate;

(d) methacrylic acid and potassium persulphate;

(e) 2-Acrylamid 2-Methylpropan Sulphonic Acid-Sodium (AMPSS) and adhesion promoter I;

(f) adhesion promoter II and obtaining therefrom said vinyl acetate ter-polymer based emulsion composition.

According to yet another preferred aspect of the present invention providing ingredient (d) of methacrylic acid and potassium persulphate in the pre-emulsion is accomplished just prior to addition of 5% Pre-emulsion in the reaction vessel;

providing ingredient (e) of 2-Acrylamido 2-Methylpropan Sulphonic Acid-Sodium (AMPSS) and adhesion promoter I in the pre-emulsion is effected post addition of 5% of the pre-emulsion free of AMPSS as seed in the reaction vessel to favour AMPSS reaction with said monomers by avoiding homo polymerization reactions;

providing ingredient (f) of adhesion promoter II is carried out after 80% completion of addition of the remaining pre-emulsion in the reaction vessel.

According to another preferred, aspect of the present invention said process is provided wherein the anionic reactive surfactant of Formula (I) is provided in the levels of 0.3 to 0.4 wt % on monomer solids and a non-ionic surfactant of alcohol ethoxylates with 19-20 mole ethoxylation is provided in amounts of 1 to 1.2 wt and 2-acrylamido propane sulfonic acid sodium salt (AMPSS) is provided at the levels of 0.8-1.2 wt % on monomer solids in said pre-emulsion.

The present invention is described hereunder in greater details in relation to the non-limiting exemplary illustrations and should not be construed to limit the scope of the present invention.

DETAILED DESCRIPTION OF THE INVENTION

As discussed hereinbefore the present invention provides for a surfactant stabilized vinyl acetate ter-polymer based emulsion comprising surfactant combination based freeze thaw stabilized vinyl acetate ter-polymer emulsion wherein said surfactant combination comprises non-ionic surfactant in combination with at least two polymerizable anionic reactive surfactants. A process for manufacture of said emulsion is provided that is freeze thaw stable together with a particle size of 130-150 nm.

Usually anionic surfactants are predominantly used in the reactor in emulsion polymerization processes and use of non-ionic surfactants slows down the reaction rates of the monomers.

Importantly, it was found by way of the present invention that the non-ionic surfactant in combination with at least two reactive anionic surfactant is one of the key parameters to get freeze thaw stability which when present in amounts of 0.2 wt % offers freeze thaw stability without affecting the reaction rate of the monomers when present in combination with at least two reactive anionic surfactants.

According to an embodiment of the present invention following are the basic and optional process features:

Example 1

In the Reactor: (A)
1. Demineralized water—19-21 wt %
2. Non-ionic surfactant (alcohol ethoxylates with 19-20 mole ethoxylation—0.1-0.3 wt %
3. Potassium per sulphate—0.025-0.075 wt %

Pre-Emulsion: (B)
1. Demineralized water—21-23 wt %
2. Polymerizable anionic reactive surfactant *—0.3-0.4 wt %

Polymerizable anionic reactive surfactant * has the following structure;

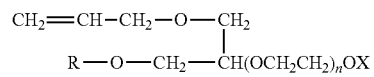

Where R is alkyl group, X is $SO_3NH_4$, $SO_3Na$, n=10

3. Non-ionic surfactant (alcohol ethoxylates with 19-20 mole ethoxylation)-1 to 1.2 wt %
4. Sodium bi carbonate—0.1-0.3 wt %
5. Potassium per sulphate—0.1-0.2 wt %
6. Vinyl acetate—33-35 wt %
7. VeoVa10—8-10 wt %
8. Butyl acrylate—4-6 wt %
9. Glacial Methacrylic acid—0.1 to 0.2 wt %
10. 2-Acrylamido propane sulphonic acid-Sodium salt (anionic polymerizable surfactant) **—0.8 to 1.2 wt % in pre-emulsion.
11. Adhesion promoter I—0.05-0.1 wt %
12. Adhesion promoter II—0.3-0.5 wt %

Digestion C:
1. Tertiary butyl hydroperoxide—0.05-0.07 wt %
2. Sodium formaldehyde sulphoxylate—0.04 to 0.06 wt %

Additives:
1. Biocide—0.2 wt %
2. Water—Balance to get 50% solid

Example 2

Preparation of Reactor Charge (A)

Demineralised water was charged at room temperature and stirred. The temperature was raised to 40-50° C. Non-ionic surfactant (alcohol ethoxylates with 19-20 mole ethoxylation) was then charged and flushed with Demineralised water. Potassium PerSulfate was charged and flushed with water.

Preparation of Monomer Pre-Emulsion (B)—

Demineralised water was charged and stirring was started. Polymerizable anionic reactive surfactant * of the structure represented above was charged, first it was allowed for dissolution and then Non-ionic surfactant (alcohol ethoxylates with 19-20 mole ethoxylation) was added and flushed with Demineralised water Sodium bicarbonate was charged and flushed with Demineralised water. Charge Vinyl acetate Monomer, VeoVa10 Monomer, Butyl Acrylate Monomer and was flushed with Demineralised water. Glacial Methacrylic Acid was charged and flushed with Demineralised water, Potassium per sulphate solution was prepared in Demineralised water and charged.

Importantly apart from the selective surfactant combination that leads to the emulsion the process of the present invention to achieve the product emulsion is based on the selective sequence of addition of the ingredients wherein i) Methacrylic Acid and Potassium PerSulphate solution are added in the pre-emulsion just prior to the addition of 5% pre-emulsion in the reactor; ii) Pre-emulsion that needs to be added (5%) in the reactor should not contain 2-acrylamido 2-methylpropan sulphonic acid-sodium and adhesion promoter I and the addition of 2-Acrylamido 2 Methylpropan sulphonic acid-sodium and adhesion promoter I is to be done into Pre Emulsion vessel after 5% Pre emulsion addition had been done into the reactor. iii) addition of adhesion promoter II and Demineralised water is carried out about 4 hrs after completion of addition of the remaining pre-emulsion in the reaction vessel.

The remaining steps are usual emulsion polymerization, conditions involving digestion of the synthesized polymer at 80° C. for 1 hour, followed by cooling, addition of biocide and filtration.

Surprisingly it was thus found that employing only polymerizable anionic reactive surfactant instead of the above selective combination of surfactants gives an unstable emulsion wherein the emulsion was also found to be unstable when the selective sequence of addition under the process was not followed even though (the selective surfactant combination is used.

It is thus possible by way of the present invention to provide for surfactant stabilized vinyl acetate ter-polymer based emulsion with superior binding power comprising surfactant combination based freeze thaw stabilized emulsion wherein said surfactant combination comprises non-ionic surfactant in combination with at least two polymerizable anionic reactive surfactants. More particularly, a process for manufacture of said emulsion is also provided comprising selective steps in a selective sequence by employing selective amounts of ingredients that provides said freeze thaw stable emulsion together with a particle size of 130-150 nm in said emulsion.

We claim:

1. A vinyl acetate ter-polymer based emulsion comprising:
   water; and
   a ter-polymer;
   wherein said ter-polymer comprises monomer units of vinyl acetate, vinyl neodecanoate, butyl acrylate, and two polymerizable anionic reactive surfactants;
   wherein each one of the two polymerizable anionic reactive surfactants is selected from the group consisting of:
   (1) an acrylamide derivative of 2-acrylamido 2-methylpropane sulphonic acid-sodium salt (AMPSS) and
   (2) Formula (I) shown below

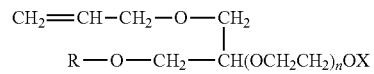

wherein said ter-polymer in said emulsion is in the form of particles, and said particles comprises particles having a size of 130-150 nm;
   wherein said emulsion is freeze thaw stable;
   wherein the emulsion does not include polyvinyl alcohols, hydroxy ethyl cellulose, and glycols; and
   wherein, in Formula (I), R is an alkyl group; X is $SO_3NH_4$, $SO_3Na$, and n=10.

2. The emulsion of claim 1, wherein the emulsion does not include colloids.

3. The emulsion of claim 1, wherein the emulsion does not include freeze thaw stabilizers.

* * * * *